March 29, 1966     J. V. FITZGERALD     3,242,735
FORCE DETECTING MEANS
Filed Sept. 10, 1962     7 Sheets-Sheet 1
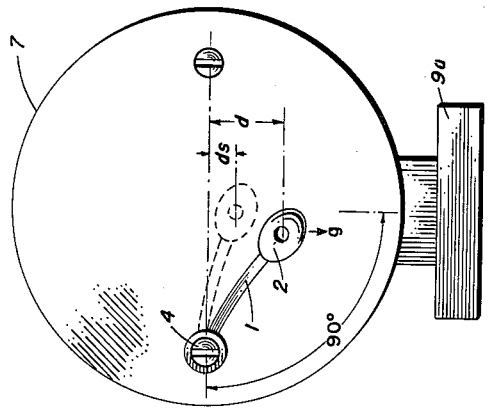
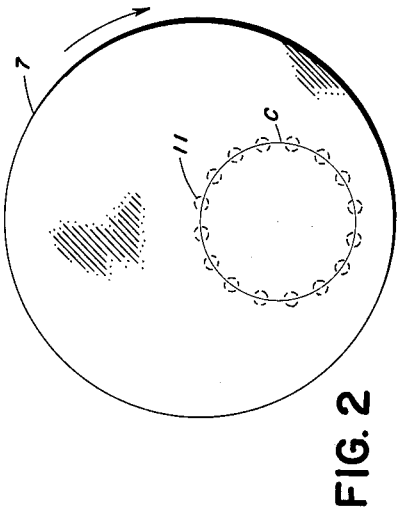
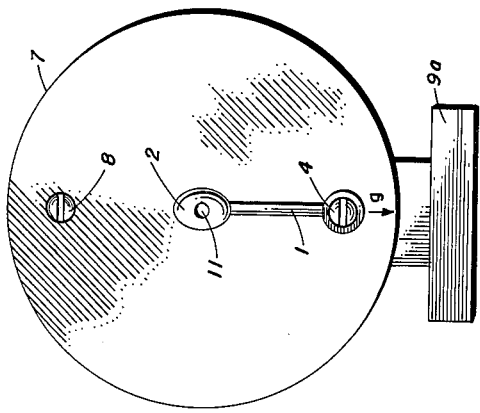
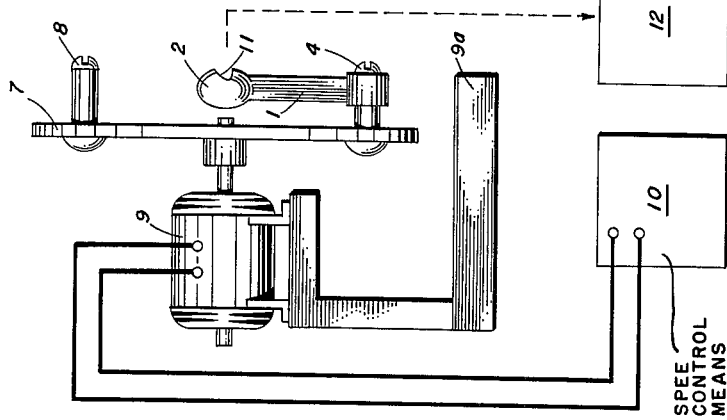
INVENTOR.
J. V. FITZGERALD
BY
MORGAN, FINNEGAN, DURHAM & PINE
ATTORNEYS

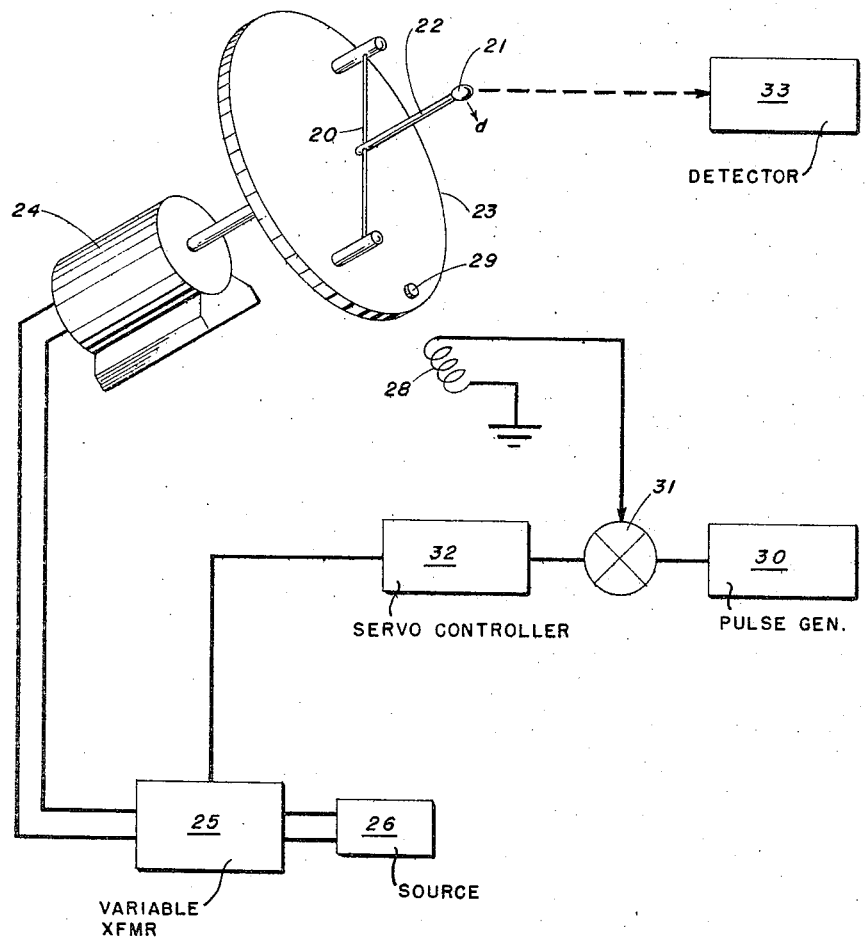

March 29, 1966 J. V. FITZGERALD 3,242,735
FORCE DETECTING MEANS
Filed Sept. 10, 1962 7 Sheets-Sheet 3

INVENTOR.
J.V. FITZGERALD
BY
MORGAN, FINNEGAN, DURHAM & PINE
ATTORNEYS

March 29, 1966     J. V. FITZGERALD     3,242,735
FORCE DETECTING MEANS
Filed Sept. 10, 1962     7 Sheets-Sheet 6

INVENTOR.
J.V. FITZGERALD
BY
MORGAN, FINNEGAN, DURHAM & PINE
ATTORNEYS

United States Patent Office 3,242,735
Patented Mar. 29, 1966

3,242,735
FORCE DETECTING MEANS
John V. Fitzgerald, 106 Norris Ave., Metuchen, N.J.
Filed Sept. 10, 1962, Ser. No. 222,374
6 Claims. (Cl. 73—382)

This invention relates to force responsive means and more particularly to dynamic mass means responsive to gravitational and analogous forces.

It is an object of the invention to provide means for detecting factors related to forces such as gravity for use in sensing and measurement, e.g., for use in gravimetric and spatial orientation applications.

These and other objects and advantages of the invention will be set forth in part hereinafter and in part will be obvious herefrom, or may be learned by practice with the invention, the same being realized and attained by means of the techniques, and instrumentalities pointed out in the appended claims.

The invention consists in the steps, methods, parts, constructions, arrangements, combinations and improvements herein shown and described.

Serving to illustrate embodiments exemplifying and illustrating the principles of the invention are the drawings of which:

FIGURE 1A is a schematic view in side elevation of a force detecting arrangement constructed in accordance with the invention;

FIGURES 1B and 1C comprise front elevation views of the device of FIGURE 1A under two different positional conditions respectively;

FIGURE 2 is a diagrammatic plot of one response characteristic manifested by the arrangement of FIGURES 1A, 1B and 1C under certain conditions;

FIGURE 3 is a schematic perspective view of another embodiment of the invention.

Figure 4:
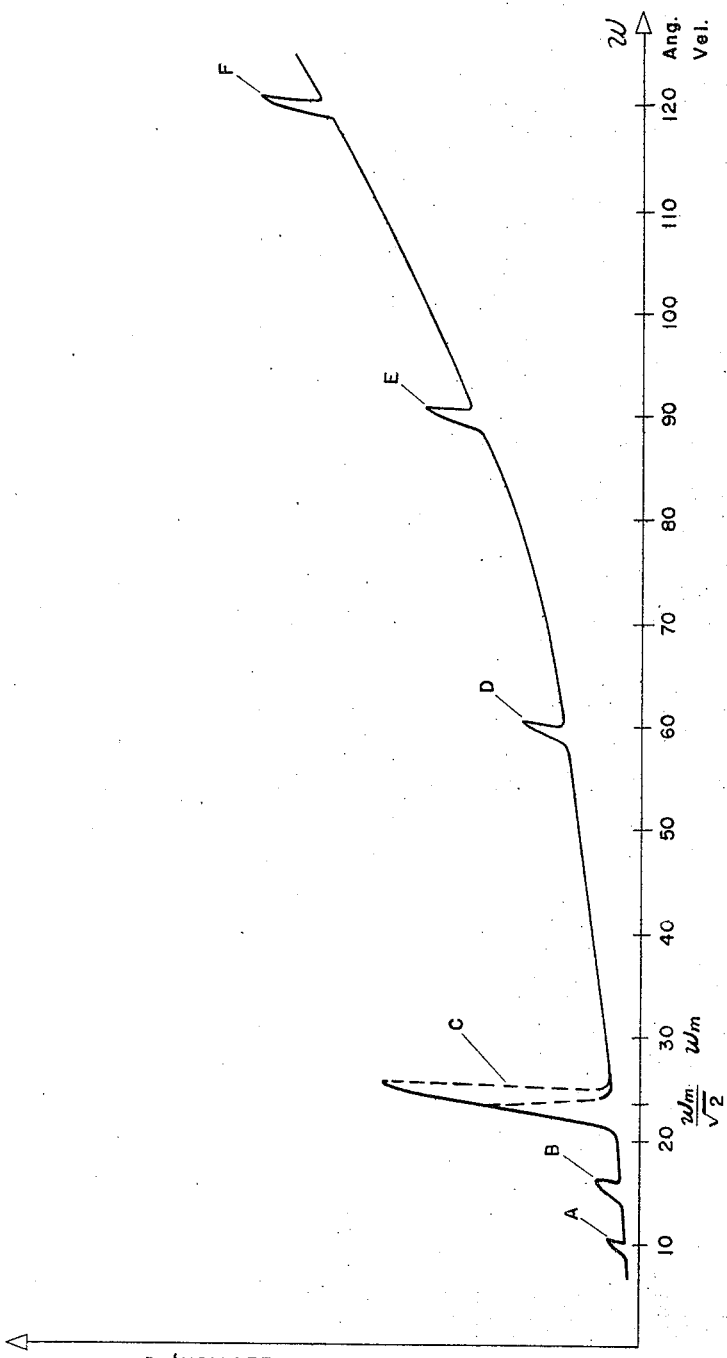
FIGURES 4–8 are diagrammatic plots of certain responses of the system embodiments.
Figure 5:
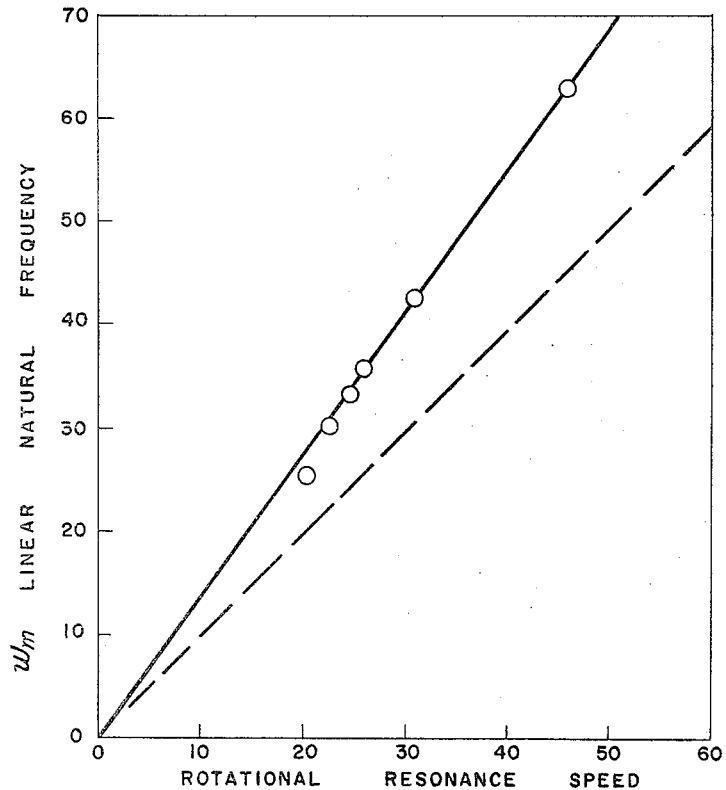

Referring to the embodiment of FIGURES 1A, 1B and 1C, there is provided an oscillatory mass system comprising a complaint element, illustratively a reed 1, to which is coupled a mass 2 as for example by fixing the mass to one end of the reed. The other end of reed 1 is fixed by way of a connector 4 to a support, embodied as a disc 7. Also fixed to disc 7 in diametric opposition to the anchoring means 4 is a counter-weight 8.

Means for driving the oscillatory mass system in the plane of vibration thereof are provided in the form of a motor 9 mounted on a base 9a and having an output shaft which is fixed to the disc 7 in axial alignment with the mass 2.

In circuit connection with the motor 9 are speed control means 10 which may comprise any suitable known speed controller ranging from a simple rheostat to the more elaborate thyratron control system.

Position defining means are included in the oscillatory mass system, illustratively in association with the mass 2. As embodied such means comprise a point 11 on mass 2, e.g., a cavity which has a reflectivity or other visual characteristics which distinguishes it from the background. For monitoring the action of the position defining means there is provided a system 12 which may comprise for example an array of photoresponsive elements such as photoelectric means which intercept the distinguished light reflected from cavity 11 and produce a signal related to the position of the latter. As one alternative, the system response may be detected magnetically by use of appropriate magnetic elements and an associated pick-up system.

For the purpose of explanation it is initially assumed that the motor 9 is inactive. If a force such as gravity $g$ acts on the mass 2 other than through the node at 4, then the mass will be deflected for example by an amount $ds$ such as indicated by the dashed lines in FIGURE 1C.

If now the oscillatory mass system is driven by the motor 9 in the plane of vibration which plane includes a gravity component, then the deflection $d$ of the mass 2 is found to respond in a manner which depends upon the relationship of the angular velocity $\omega$ of the drive means to the natural frequency $\omega_m$ of the oscillatory system.

In the region where $$\omega = \frac{m\omega}{\sqrt{2}}$$

it is found that the mass 2 executes an approximately circular pattern $c$ such as indicated in FIGURE 2. Actually, two overlapping, partially non-coincident circles are produced. It may be observed that this pattern is tangential to the axis of rotation; the pattern has a diameter equal to the amplitude of vibration as distinguished from the ordinary case of harmonic projection where the diameter equals twice the amplitude of vibration. A point-by-point observation of displacement of mass 2 indicates that it executes two complete revolutions for one revolution of the disc 7.

Compared with the displacement $ds$ caused by gravity when the disc 7 is not rotated (FIGURE 1C), the displacement of the circle $c$ is quite large and in one example the diameter thereof is several thousand times larger than the maximum stationary deflection $ds$.

It may be seen from the foregoing that the system according to the invention has application as a sensitive gravimeter with all its attendant and related uses. For example, the system will indicate spatial orientation relative to the gravity vector. As the oscillatory system is angularly displaced out of the plane of the gravity field, the amplitude of circle $c$ decreases, approaching a null condition when the plane of vibration is orthogonal to the gravity field, i.e., horizontal. Thus the system of the invention provides means for evaluating orientation relative to the vertical and when coupled to an appropriate control system will produce a vertical seeking response.

The magnitude of the gravity force $g$ decreases as a function of altitude. This decrease is quite small. However, in view of the sensitivity of the system herein described, absolute altitude may be measured as a function of the actual magnitude of the gravitational force.

The system according to the invention also finds application to forces produced by acceleration and magnetic fields as well as mechanical, hydraulic and pneumatic forces such as differential and impact pressure produced by a fluid medium. If the system of the invention is accelerated, a change in the amplitude of circle $c$ will be observed which change varies as a function of this acceleration. Hence, the system has application as an accelerometer or as an instrument for determining seismic forces as from earthquakes or underground nuclear explosions. If an element of the vibratory system, such as mass 2, is responsive to a magnetic field then, in analogous manner, the amplitude of the circle $c$ will vary as a function of the intensity of this field.

In FIGURE 3 an alternate embodiment is shown in which the oscillatory mass system comprises a torsion member embodied as a torsional wire 20 to the central point of which is coupled a mass 21 by way of a connector embodied as a needle 22 having the mass and torsion member fixed on the respective ends thereof. The plane of vibration of mass 21 is orthogonal to the axis of wire 20. The torsion member is mounted in turn on a base 23 fastened on the shaft of drive means embodied as an A.C. motor 24, the speed of which is controlled by variable transformer 25 in the circuit between the motor and a source 26. Transformer 25 may be servo controlled by way of speed sensing means illustratively embodied as a magnetic pick-up coil 28 which is pulsatingly energized by a magnetic element 29 on base 23. The output of coil 28 is compared with the output of a pulse generator 30 in an error detector 31 the output of which controls transformer 25 by way of servo controller 32.

In exemplary constructions according to FIGURE 4, where for example the torsion member comprises a steel wire 4" x .003", the resonant frequency typically occurs at a frequency lying in the range 10 to 60 c.p.s.

The system of FIGURE 3 may also include means for detecting the response of the oscillatory mass system. Thus the mass 21 may be magnetic, photo-emissive or radioactive, thus propagating a relative spatial pattern which is dependent on such factors as the direction and magnitude of the applied force. This pattern may be suitably sensed as indicated at 33 by a magnetic, photo-responsive, or particle detector.

The response of the system of FIGURE 3 in terms of deflections $d$ of mass 21 when subjected to a force such as gravity, is generally similar to that hereinbefore described. Thus as seen by reference to FIG. 4, the deflection of the mass, manifested as a circular pattern $c$ having a center which is displaced from the axis of rotation, rises to a maximum when motor speed approaches the resonant frequency of the oscillatory system. FIGURE 4 shows that the rotational resonance occurs at a lower frequency equal to $$\frac{\omega_m}{\sqrt{2}}$$

When the speed of rotation approaches the natural frequency of vibration divided by $\sqrt{2}$ the restoring force appears to become nearly neutralized. Thus twice each revolution the applied external force or forces act sequentially on the vibrating member increasing its amplitude to a relatively large diameter. In the absense of an external force field, such as when the vibrating member's plane of rotation is horizontal, the amplitude is zero or minimal.

It should be noted that, the system being non-linear, there are certain discontinuities in the response around the region of resonance. For example, if the resonant speed is approached from a higher value, the circle $c$ is displaced in the opposite direction from the axis of rotation than is the case when resonance is approached from a lower speed.

Figure 6:
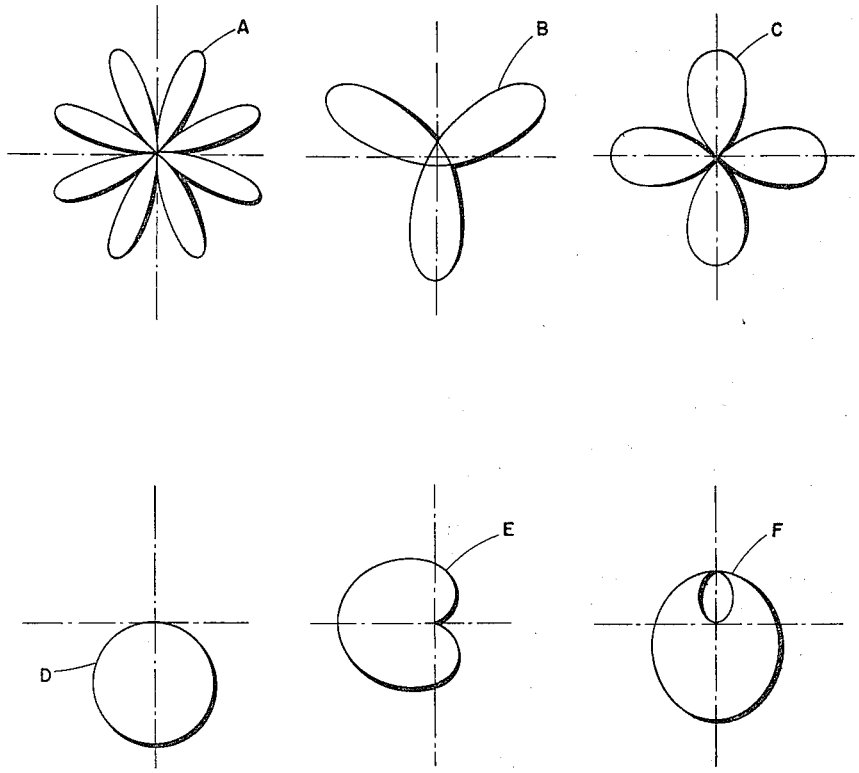

Also shown in FIGURE 4 are certain amplitude changes which occur in the region of sub-harmonics and harmonics of the resonant frequency. The pattern executed by the mass 21 at these various points is shown in FIGURE 6. Thus, the amplitude rise indicated at A in FIGURE 4 is manifested as a trifolium B such as shown in FIGURE 6. This pattern occurs at a rotational speed near the region of one-third the resonant frequency.

The patterns A, B, C, D, E and F may be derived from simplified applicable trigonometric relationships; the patterns A–C, E and F, which occur in the region of sub-harmonics and harmonics, are not substantially responsive to the force vector. They may be most easily observed as transients excited when the motor speed is rapidly varied from the resonant value to values below and above the same corresponding with the sub-harmonics and harmonics. They also may be observed in the steady state if some energy is fed into the vibrating system from, for example, a flexible support for the motor. These curves are exemplary since many other patterns occur under various conditions.

Figure 7:
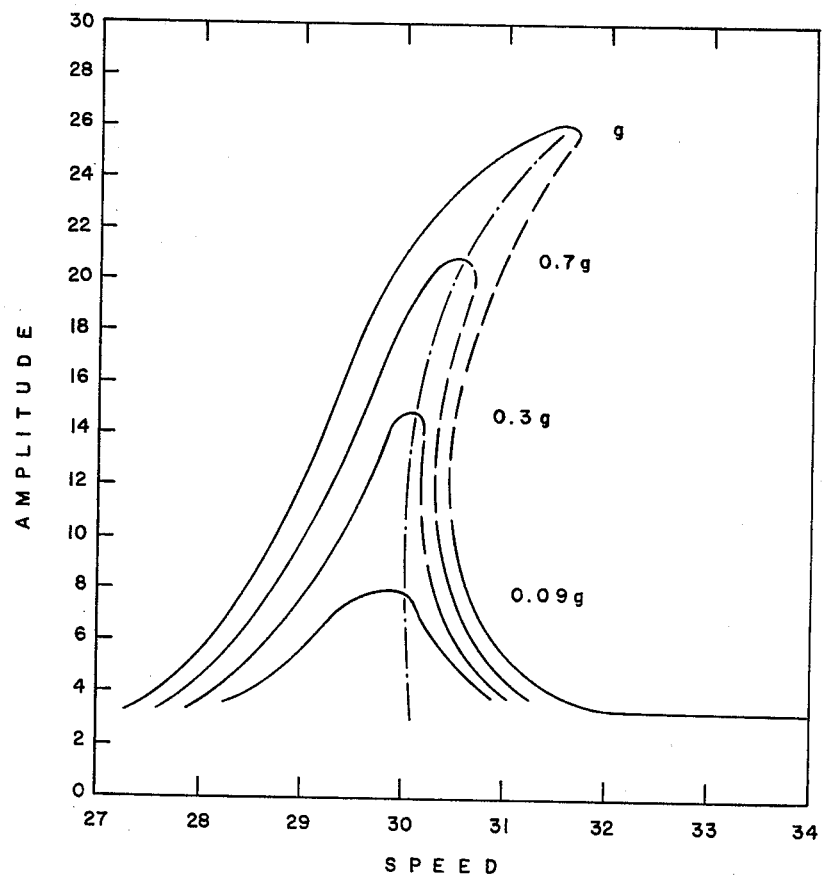
Figure 8:
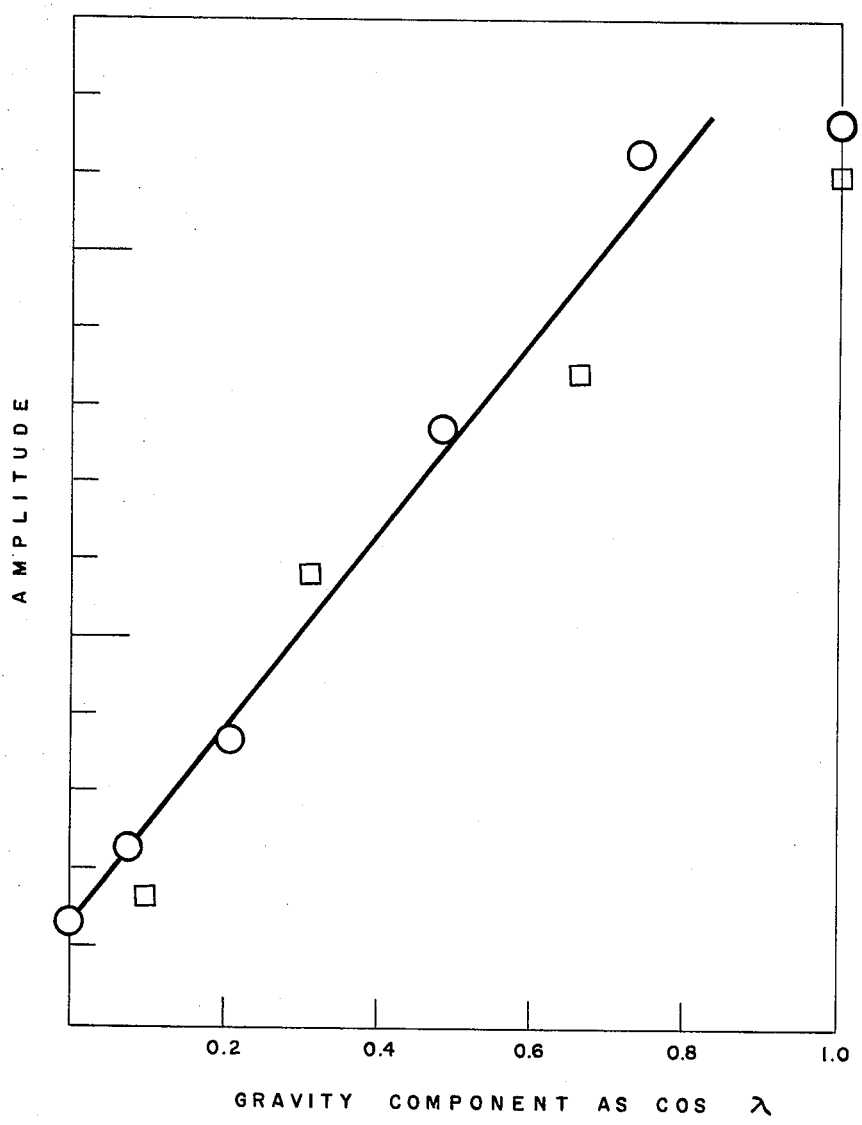

The system according to the invention is non-linear with respect to deflection as a function of driving speed as shown in FIGURE 7. This family of curves was obtained by varying the inclination of the vibration-rotation axis and thereby the gravitational force component. Linearity in the relationship between deflection and applied force, e.g., magnitude of the gravity vector acting in the plane of rotation is suggested by the plot in FIGURE 8 of amplitude of circle $c$ versus component of gravity expressed as cosine $\lambda$, where $\lambda$ is the angular deviation of the plane of rotation from the horizontal.

It should also be noted that certain other characteristics appear in the response of the vibratory system. The circle $c$ produced at resonance when the oscillatory system is subjected to a force is found to be generally displaced slightly to the left or to the right of the vertical depending upon whether rotation is counter-clockwise or clockwise. As the speed of rotation is increased through the rotational resonance regions the phase changes, causing the circle to rotate from a pendant position discontinuously to a superimposed position and vice versa. It should also be observed that in considering the natural frequency of the oscillatory system, the same will be changed slightly due to non-uniform effects of gravity thereon. It has also been found that force-induced circular patterns are also produced notwithstanding the vibratory system is slightly eccentric with respect to the axis of rotation.

By orienting in space with respect to a reference axis the magnitude and direction of gravitational and inertial forces can be determined by this invention. Small changes in external field strength may also be measured as changes in input energy necessary to maintain a constant speed previously selected in the critical rotational-resonance region.

The invention in its broader aspects is not limited to the specific mechanisms and methods herein shown and described but departures may be made therefrom within the scope of the accompanying claims without departing from the principles of the invention and without sacrificing its chief advantages.

What is claimed is:

1. Force responsive apparatus comprising an oscillitory mass system having compliant means and an oscillatory element deflectable in the presence of said force, means for rotatably driving said system about an axis orthogonal, in the force sensing position, to at least a component of said force, said driving means including means for adjusting said system to a rotational speed related to the period of resonant oscillation of said mass system such that said oscillatory mass system provides cyclical deflections responsive to said force component which are magnified over static deflections of said element.

2. Apparatus according to claim 1 in which said oscillatory mass system comprises a discrete mass connected to compliant means.

3. Apparatus according to claim 1 in which said speed is substantially of a value selected from the fundamental, harmonics and sub-harmonics of the natural frequency of said mass system.

4. Apparatus according to claim 2 in which said compliant means comprise torsion means.

5. Apparatus according to claim 1 including means for detecting the cyclical deflection pattern of said oscillatory mass system.

6. Apparatus according to claim 5 including means for controlling the output of said drive means.

(References on following page)

References Cited by the Examiner

UNITED STATES PATENTS

| | | | |
|---|---|---|---|
| 2,225,566 | 12/1940 | Ide | 73—382 |
| 2,319,940 | 5/1943 | Marrison | 73—382 |
| 2,599,539 | 6/1952 | Boyd et al. | 73—71 |
| 2,726,074 | 12/1955 | Ketchledge | 73—382 X |
| 2,928,667 | 3/1960 | Peterson | 73—517 X |
| 3,014,374 | 12/1961 | Johnston | 73—517 |
| 3,103,819 | 9/1963 | Blasingame | 73—382 |
| 3,140,612 | 7/1964 | Houghton et al. | 73—712 X |

RICHARD C. QUEISSER, *Primary Examiner.*

JOSEPH P. STRIZAK, *Examiner.*

C. A. RUEHL, *Assistant Examiner.*